United States Patent [19]

Benichou

[11] 4,326,890

[45] Apr. 27, 1982

[54] BEDDING ANCHORAGE RODS

[76] Inventor: Alain Benichou, Residence de la Gare 24, Pontailler, Saore, France

[21] Appl. No.: 926,921

[22] Filed: Oct. 2, 1978

[51] Int. Cl.$^3$ ............................................. C04B 31/00
[52] U.S. Cl. ...................................... 106/77; 106/84; 106/110; 206/219; 206/526; 405/261
[58] Field of Search ................. 106/77, 84, 109, 110, 106/111; 206/524, 219, 525, 526; 405/259, 260, 261, 266; 299/11, 12

[56] References Cited

U.S. PATENT DOCUMENTS

| | | | |
|---|---|---|---|
| 3,925,996 | 12/1975 | Wiggill | 405/261 |
| 4,096,944 | 6/1978 | Simpson | 106/111 |
| 4,126,003 | 11/1978 | Tomic | 405/261 |
| 4,126,005 | 11/1978 | Coursen | 405/261 |
| 4,127,001 | 11/1978 | Tomic | 405/261 |
| 4,216,180 | 8/1980 | Seemann et al. | 405/261 |

*Primary Examiner*—James Poer
*Attorney, Agent, or Firm*—Gifford, Van Ophem, Sheridan & Sprinkle

[57] ABSTRACT

A composition, cartridge, and process for bedding anchorage rods, particularly in mine galleries.

A mixture of silicate solution and sand/powdered silica are provided in one chamber of an anchoring cartridge. A breakable liner is provided in the cartridge between the mixture and a portion of plaster to be admixed therewith. The cartridge is placed in position and the anchorage rod is inserted thereby breaking the liner and securing the rod in place.

23 Claims, 2 Drawing Figures

BEDDING ANCHORAGE RODS

This invention is concerned, with the bedding of anchorage rods, especially in mine galleries.

In the execution of construction works, it is usual to strengthen galleries bored into unstable ground by means of rods or bolts bedded into holes drilled to a depth of several meters into the ground. The bedding of these rods is performed by means of compositions based on polyester resins which, although giving satisfactory results, have a number of disadvantages. Some of the constituents of these resins are relatively volatile and can result in the release of noxious vapours into the galleries. In excess, these same constituents are flammable and there is a risk of causing accidents by local outbreaks of fire. Further, the price of these resins is high.

Accordingly, there is a need for new bedding compositions possessing the same quick setting properties as the polyester resins, and of much the same strength, but non-flammable, not releasing noxious vapours, having a long life in use, and of lower cost.

The present invention is based on the use for this application of compositions based on plaster, silica and sodium silicate. Such compositions have already been envisaged in theoretical studies on adhesive compositions (see for example "Handbook of Adhesives" Irving Skeist, New York 1962, pages 98-99).

Figure 1:
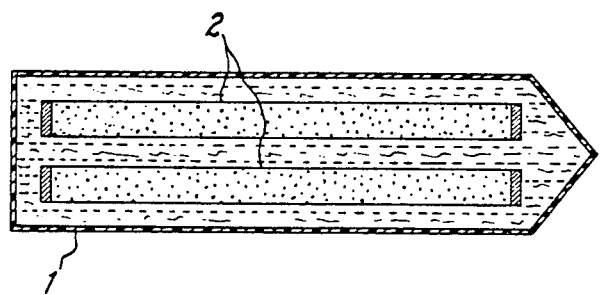
FIG. 1 represents a longitudinal section through the cartridge of the invention.

One aspect of the present invention is a new application for this type of composition and another aspect is the selection of certain of those compositions which are especially appropriate to this application.

According to one aspect of the present invention there is provided a method of bedding-in anchorage rods or bolts, particularly in mine-galleries, wherein there is used a bedding composition comprising plaster, dry sand or powdered silica and a solution of sodium silicate.

The constituents may be contained in a plastic sheath with the active components separated by a frangible barrier so that introduction of the rod or bolt breaks the barrier and mixes the constituents. Alternatively, the constituents may be injected simultaneously by syringe or other means previously known in the art into a hole drilled for the rod or bolt, and the rod or bolt inserted immediately thereafter.

According to another aspect of the present invention there is provided a bedding composition for use in the method of the invention, comprising plaster, dry sand or powder, and solution of a sodium silicate having a weight ratio $SiO_2/Na_2O$ of 2-2.10, being of 44°-46° Baumé at 20° C., a viscosity of 100-200 cPo and a density at 0° C. of 1.446-1.482.

According to another aspect of the present invention there is provided a composition of the invention in the form of a charge for insertion in a drill hole, comprising a cylindrical polyethylene sheath containing a solution of sodium silicate with sand or powdered silica suspended therein and at least one fragile liner containing plaster. In the preferred embodiment of the invention such liner may be a tube with walls of thin glass or other frangible material.

In order that the bedding compositions can achieve the strength and quick setting required for bedding anchorage rods, we have found that certain conditions must be complied with. Firstly certain properties of the silicate solution must be suitable, secondly certain proportions of the silica must be used, and finally certain relative proportions between the plaster and the silica must be followed. As far as the properties of the silicate, it has been found experimentally that a liquid sodium silicate possessing a weight ratio $SiO_2/Na_2O$ of 2 to 2.10 and of 44° to 46° Baumé at 20° C. is suitable for this new application. The silicate generally has a viscosity of 100 to 200 cPo and a density at 0° C. of 1.446 to 1.482. A suitable commerically available product is that supplied by Rhone-Progil under the designation "10 N 20" and having the following composition:

| | |
|---|---|
| $SiO_2$ | 26.6% |
| $Na_2O$ | 13.1% |
| $H_2O$ | 60.0% |

As far as the proportions of the silicate are concerned, experience shows that the more silica in the composition, the shorter is the setting time. It is always necessary to fix an upper limit to this amount in order to permit the introduction of the rod to be bedded.

In practice, it is also necessary to take into consideration the ratio $CaSO_4/Na_2SiO_3$, although the individual values of the upper and lower limits of the proportions of each constituent can only be determined in a relative manner and not absolutely.

In practice, the strength of these compositions is suitably close to those of polyester compositions as can be seen from the following examples of formulations.

| Formulation No. 1 | |
|---|---|
| Plaster "Herculite No. 2" | 25 parts |
| Dry Sand | 25 parts |
| Silicate "10 N 20" | 25 parts |

| Bedding Test 1. |
|---|
| Setting time 45 to 60 seconds |
| Length of bedding 95.mm |
| Maximum withdrawal load after 4/5 hours 3T 848 |

| Bedding Test 2. |
|---|
| Setting time 45 to 60 seconds |
| Length of bedding 88 mm |
| Maximum withdrawal load after 4/5 hours 4T 104 |

| Formulation No. 2 | |
|---|---|
| Plaster "Herculite No. 2" | 25 parts |
| Dry Sand | 25 parts |
| Silicate "10 N 20" | 27 parts |

| Bedding Test |
|---|
| Setting time 65 seconds |

-continued

| Bedding Test |
|---|
| Length of bedding 95 mm |
| Maximum withdrawal load after 4/5 hours 14T 959 |

| Formulation No. 3 | |
|---|---|
| Plaster "Herculite No. 2" | 25 parts |
| Dry Sand | 25 parts |
| Silicate "10 N 20" | 30 parts |

| Bedding Test |
|---|
| Setting time 70 to 75 seconds |
| Length of bedding 80 mm |
| Maximum withdrawal load after 4/5 hours 3T 848 |

A comparison between these three compositions and their properties shows that as the amount of silicate "10 N 20" is increased in the mortar the setting time is increased. The following examples of formulations 4, 5, and 6 show the variation in the properties of different compositions as a function of the amount of plaster in the compositions and show at the same time a limit determined by the value of the strength of adhesion to a metal rod.

| Formulation No. 4 | |
|---|---|
| Plaster "Herculite No. 2" | 12.5 parts |
| Powdered Silica | 12.5 parts |
| Silicate "10 N 20" | 15 parts |

In this composition the percentage ratio of water/water+plaster is 41.86%, the ratio $SiO_2$/plaster 31.92%, the ratio $Na_2O$/plaster 15.72%.

The setting time of this composition is 68 seconds. Its resistance to compression is 225.5 bars and the strength of adhesion to a metallic rod is 70 kg/cm$^2$.

| Formulation No. 5 | |
|---|---|
| Plaster "Herculite No. 2" | 6 parts |
| Powdered Silica | 19 parts |
| Silicate "10 N 20" | 15 parts |

The ratios water/water+plaster, $SiO_2$/plaster and $Na_2O$/plaster are respectively 60, 66.5 and 32.75%.

The setting time of this composition is 2 minutes 10 seconds. Its resistance to compression is 180 bars and its strength of adhesion to a metallic rod is 57.4 kg/cm$^2$.

| Formulation No. 6 | |
|---|---|
| Plaster "Herculite No. 2" | 3 parts |
| Powdered Silica | 22 parts |
| Silicate "10 N 20" | 15 parts |

The ratios water/water+plaster, $SiO_2$/plaster and $Na_2O$ plaster are 75, 133 and 65.5% respectively.

The setting time was around 4 minutes, the resistance to compression 110 bars and its strength of adhesion to a metallic rod was only 19 kg/cm$^2$.

For purposes of comparison with the three prior Formulations, it is obvious that Formulations 4, 5, and 6 may be as easily expressed as formulae based upon 30 parts silicate "10 N 20" as on 15 parts. The reexpressed formulae are thus:

| Formulation No. 4 | |
|---|---|
| Plaster "Herculite No. 2" | 25 parts |
| Powdered Silica | 25 parts |
| Silicate "10 N 20" | 30 parts |

| Formulation No. 5 | |
|---|---|
| Plaster "Herculite No. 2" | 12 parts |
| Powdered Silica | 38 parts |
| Silicate "10 N 20" | 30 parts |

| Formulation No. 6 | |
|---|---|
| Plaster "Herculite No. 2" | 6 parts |
| Powdered Silica | 44 parts |
| Silicate "10 N 20" | 30 parts |

The comparison of these three compositions and their properties shows that as the amount of plaster diminishes relative to the amount of silicate, the setting time is increased, and the formulation no. 6 represents a lower limit since the setting time of this composition is double that of formulation no. 4, and above all the strength of adhesion to the metallic rod is very weak.

From formulations 1–3 and 4–6 it can be seen that 6 parts by weight of plaster is the lower limit determined; therefore, the Formulations indicate a useable range of 6 to 25 parts by weight of plaster. Similarly 25 to 44 parts silicate by weight is the limit for the silicate content; and from Formulations 1–3 to 30 parts by weight silicate is the limit for the silicate content, observed to be optimal at 27 parts by weight.

In the formulations cited above, the silicate solution is always that supplied under the designation "10 N 20" by Rhone-Progil as indicated earlier, but it is equally possible to use other silicate solutions, such as those also supplied by Rhone-Progil under the designation "60 N 20" and having the following composition:

| | |
|---|---|
| $SiO_2$ | 30.6% |
| $Na_2O$ | 15.0% |
| $H_2O$ | 53.60% |

In contrast, other silicate compositions are not suitable, for example the composition supplied by Rhone-Progil under the designation "5 N 40" having the following composition:

| | |
|---|---|
| $SiO_2$ | 22.7% |
| $Na_2O$ | 5.7% |
| $H_2O$ | 71.40% | and the composition supplied under the designation "20 N 32" which have the following composition:

| | |
|---|---|
| $SiO_2$ | 28.5% |
| $Na_2O$ | 8.9% |
| $H_2O$ | 62.10% |

It will be noticed that when the weight ratio SiO$_2$/Na$_2$O falls below 2, that is to say the silicate is more siliceous, the setting time becomes too short for the application envisaged in the present application.

Figure 2:
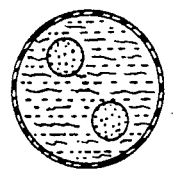
FIG. 2 represents a transverse section through the cartridge of the invention.

The present invention is also concerned with a composition of the invention in the form of a charge in a particular physical form illustrated by the accompanying drawings, in which FIG. 1. represents a longitudinal section through such a charge, and FIG. 2. is a transverse section.

In the drawing reference 1 indicates a sheath of high density polyethylene which has for example dimensions of approximately 0.1 mm thickness a diameter of 23 mm and a length of 495 mm. This sheath contains the silicate solution, which by way of example is approximately 83 grams in weight, in which is held in suspension powdered silica, for example 68 grams.

Parallel to the longitudinal axis of the cylindrical sheath is disposed at least one fragile liner, which in the preferred embodiment comprises two glass tubes 2 sealed at each end by hydrated clay and which by way of example can have a wall thickness of approximately 0.70 mm and a diameter of approximately 11 mm.

These tubes contain the third constituent of the composition, a plaster such as "Herculite". When the rod to be bedded is introduced into the charge and rotated, the three constituents are mixed together. A suitable rod typically has a diameter of approximately 20 mm. After introduction and rotation of this rod for approximately 15 seconds, the setting time of the composition, which is of the order of a few seconds as appears from the examples, is reached at the conclusion of these 15 seconds of rotation.

It will be appreciated that instead of the glass tubes 2 it is possible to use tubes of any other material which is thin, rigid and fragile, such as filled polyethylene and similar materials. With this arrangement and separating of the constituents of the composition, as far as the ratio and proportions are respected, the most favourable adhesion of the rod to the interior of the bedding material is obtained.

What is claimed is:

1. A composition for bedding anchorage rods in mine galleries comprising:
   (a) about 6 to 25 parts by weight of plaster;
   (b) about 20 to 44 parts by weight of at least one member selected from the group consisting of sand and silica powder; and
   (c) about 25 to 30 parts by weight of a solution of sodium silicate, said solution having at least about 2 parts by weight SiO$_2$ to 1 part by weight Na$_2$O.

2. The composition as defined in claim 1 wherein said plaster is 25 parts by weight, said at least one member is 25 parts by weight and said silicate is 25 parts by weight.

3. The composition as defined in claim 1 wherein said plaster is 25 parts by weight, said at least one member is 25 parts by weight and said silicate is 27 parts by weight.

4. The composition as defined in claim 1 wherein said plaster is 25 parts by weight, said at least one member is 25 parts by weight and said silicate is 30 parts by weight.

5. The composition as defined in claim 1 wherein said plaster is 12 parts by weight, said at least one member is 38 parts by weight and said silicate is 30 parts by weight.

6. The composition as defined in claim 1 wherein said plaster is 6 parts by weight, said at least one member is 44 parts by weight and said silicate is 30 parts by weight.

7. A cartridge for bedding anchorage rods in mine galleries, said cartridge comprising:
   a sheath containing a mixture of from about 20 to 44 parts by weight of at least one member selected from the group consisting of sand and silica powder, and about 25 to 30 parts by weight of a solution of sodium silicate, said solution having at least 2 parts by weight SiO$_2$ to 1 part by weight Na$_2$O; and
   at least one fragile liner disposed in said mixture within said sheath, said liner separating about 6 to 25 parts by weight plaster from said mixture.

8. The cartridge of claim 7 wherein said at least one liner is glass.

9. The cartridge of claim 7 wherein said at least one liner is polyethylene.

10. The cartridge of claim 7 wherein said sheath is plastic.

11. The cartridge of claim 10 wherein said plastic is polyethylene.

12. A process for bedding anchorage rods in mine galleries, said process comprising:
   (a) placing a sheath in the ground
   (b) putting into the sheath a mixture of from about 20 to 44 parts by weight of at least one member selected from the group consisting of sand and silica powder, and about 25 to 30 parts by weight of a solution of sodium silicate, said solution having at least 2 parts by weight SiO$_2$ to 1 part by weight Na$_2$O;
   (c) disposing in said sheath at least one fragile liner, said liner separating plaster from said mixture;
   (d) projecting at least one anchorage rod into said sheath;
   (e) then mixing said rod about within said sheath so as to break said at least one fragile liner, whereby said plaster is mixed with said mixture.

13. The process of claim 12 wherein said liner is a container.

14. The process of claim 12 wherein said liner is glass.

15. The process of claim 12 wherein said liner is plastic.

16. The process of claim 15 wherein said plastic is polyethylene.

17. A process for bedding anchorage rods in mine galleries, said process comprising simultaneously injecting into a hole previously drilled into a gallery wall or ceiling, said drilling and injecting occurring by previously-known means, both about six to twenty-five parts by weight plaster and a mixture of from about 20 to 44 parts by weight of at least one member selected from the group consisting of sand and silica powder, and about 25 to 30 parts by weight of a solution of sodium silicate, said solution having at least 2 parts by weight SiO$_2$ to 1 part by weight Na$_2$O, and inserting at least one rod into said hole, so that said at least one rod is embedded in said hole upon the solidifying of said mixture and said plaster.

18. The cartridge of claim 7 wherein said at least one member is 25 parts by weight, said solution is 25 parts by weight, and said plaster is 25 parts by weight.

19. The cartridge of claim 7 wherein said at least one member is about 25 parts by weight, said solution is 27 parts by weight, and said plaster is 25 parts by weight.

20. The cartridge of claim 7 wherein said at least one member is 25 parts by weight, said solution is 30 parts by weight, and said plaster is 25 parts by weight.

21. The cartridge of claim 7 wherein said at least one member is 38 parts by weight, said solution is 30 parts by weight, and said plaster is 12 parts by weight.

22. The cartridge of claim 7 wherein said at least one member is 44 parts by weight, said solution is 30 parts by weight, and said plaster is 6 parts by weight.

23. The cartridge of claim 7 wherein said plaster is present in the amount of about 6 to 25 parts by weight.

* * * * *